United States Patent [19]

Cellucci et al.

[11] Patent Number: 4,939,941
[45] Date of Patent: Jul. 10, 1990

[54] COMBINED DISTANCE AND DIAMETER MEASURING APPARATUS FOR WHEEL BALANCING MACHINE

[75] Inventors: Robert Cellucci, Danville; Duncan R. MacKay, Sunnyvale; Allan C. Madden, Woodside, all of Calif.

[73] Assignee: Coats Wheel Balancer Corp., Milpitas, Calif.

[21] Appl. No.: 243,075

[22] Filed: Sep. 9, 1988

[51] Int. Cl.$^5$ .......................... G01B 5/08; G01B 5/14; G01B 7/00; G01D 21/02
[52] U.S. Cl. .................................... 73/865.8; 73/866.1
[58] Field of Search ............................ 73/865.8, 866.1

[56] References Cited

U.S. PATENT DOCUMENTS 4,679,447 7/1987 Sieradzki et al. .................. 73/865.8

FOREIGN PATENT DOCUMENTS 968724 10/1982 U.S.S.R. ............................ 73/865.8

Primary Examiner—Tom Noland
Attorney, Agent, or Firm—Limbach, Limbach & Sutton

[57] ABSTRACT

The present invention is a pull-out distance arm for measuring both the diameter of a substantially circularly-shaped object and the distance of the plane of the circularly-shaped object from a fixed reference plane. The distance arm incorporates transducers that do not move when the arm is moved and, consequently, there is no movement in the wires connecting to the transducers, resulting in enhanced reliability.

5 Claims, 3 Drawing Sheets

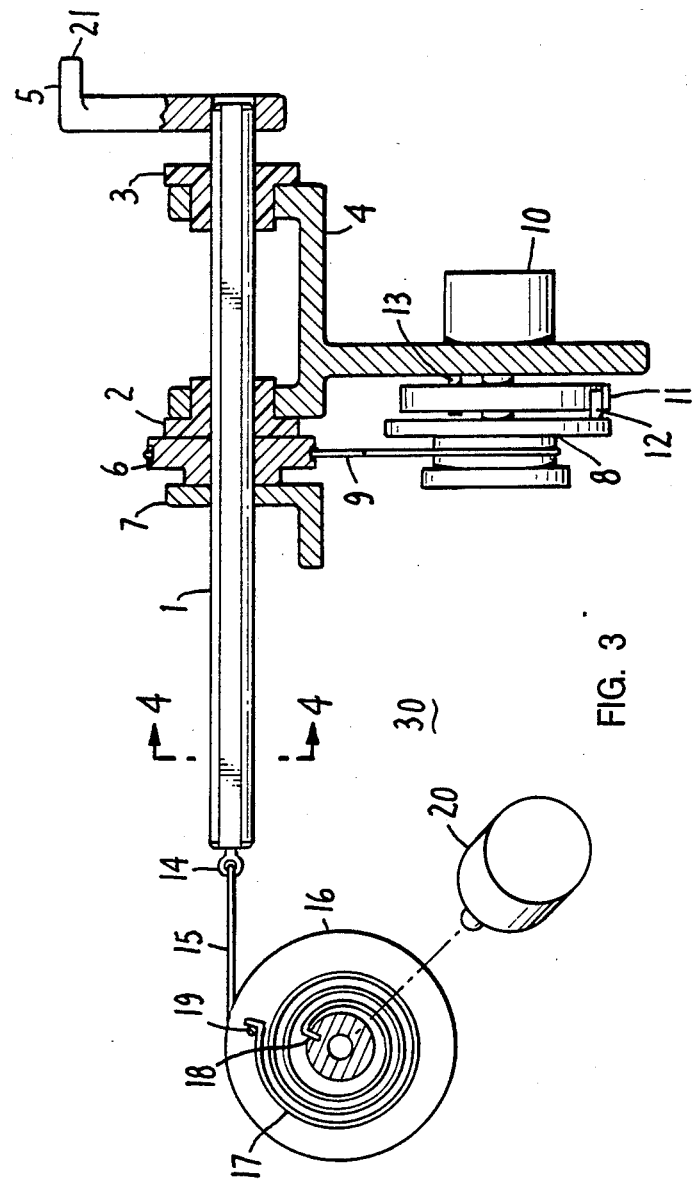
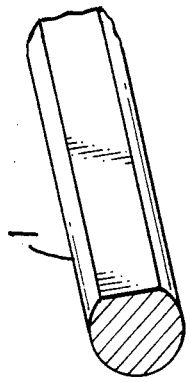
FIG. 3
FIG. 4

4,939,941

COMBINED DISTANCE AND DIAMETER MEASURING APPARATUS FOR WHEEL BALANCING MACHINE

TECHNICAL FIELD

In wheel balancing machines, it is essential to determine among other things the distance of the plane of the inner rim of a wheel from the vibration sensors and the diameter of the rim of the wheel at the point where imbalance compensating weights will be mounted.

Those two measurements are then used in equations with other dimensions to relate the measured vibration transducer signals from inside the machine to the mass and couple imbalances, known as static and dynamic imbalances, and eventually to the value and position of compensating weights in the desired balancing planes, which are usually the external rims of the wheel.

DESCRIPTION OF THE PRIOR ART

Early balancers had a pull-out metal arm with a scale on it. Usually, the arm was spring-loaded to retract automatically. The scale was used to measure the distance of the inner rim, and the measurement was entered manually into the balancer electronics by the operator. This operation, while not particularly difficult, was error-prone, especially in high-volume or dark tire shops, or at the end of the work-day when the operator was fatigued.

The pull-out metal arm (major arm) was equipped with a smaller arm (minor arm) on its outward end, and either the major arm or the minor arm was rotatable so that the end of the minor arm was made to touch the wheel rim. This ensured accurate distance measurement. The diameter measurements, read off the tire, was entered by the operator.

Later balancers attached a rack and pinion to the major arm, which then actuated a potentiometer to provide automatic data entry of the axial motion or distance. Alternatively, a toothed plate was attached to the major arm and a pair of optical sensors with quadrature outputs, well-known in the art of up-down counting, were used to automatically measure the distance. This requires accurate linear (and therefore expensive) potentiometers, but the optical method is limited by the resolution of the toothed plate and the umbra/penumbra of the optical configuration. Also, the optical pickups are sensitive to the ubiquitous dirt and dust in tire shops.

More recently, attempts have been made to automatically measure the diameter of the wheel rim by measuring the required rotation of the minor arm at the end of the major arm. Potentiometers have been attached to the end of the major arm inside the machine, and optical sensors and toothed wheels could be used similarly. Such systems have reliability problems because the rotating transducer is moved with the major arm and is therefore, subjected to impacts and jerking as the pull-out arm is extended or allowed to snap back into its rest position. Also, the connecting wires to the moving transducers form a catenary and are subjected to bending forces and vibration as the arm goes in and out.

SUMMARY OF THE INVENTION

An apparatus for measuring the distance and the diameter of a rotating object has a major arm with an axis and two ends. The major arm has a non-circular cross sectional shape along its axis. Two stationary support bearings support the major arm along its axis such that the major arm is axially slidable and rotatable. A minor arm is attached at one end of the major arm and is for rotating the major arm. A first pulley is adjacent to one of the stationary support bearings. The first pulley has a hole with a shape substantially the same as the cross-sectional shape of the major arm, such that the major arm is slidable within the pulley without moving it, and the major arm is rotatable to rotate the first pulley. A cable connects the first pulley to a first rotational transducer. A spring biases the first rotational transducer and urges it into a resting position. A cable connects the second end of the major arm to a second rotational transducer for translating the axial movement of the major arm into rotational movement.

BRIEF DESCRIPTION OF THE DRAWINGS

FIG. 3 is a partial cross-sectional side view of a distance and diameter measuring apparatus of the present invention.

FIG. 4 is a perspective cross-sectional view taken along the lines 4—4 showing the axis of the major arm of the apparatus of the present invention.

DESCRIPTION OF THE PREFERRED EMBODIMENT

Figure 1:
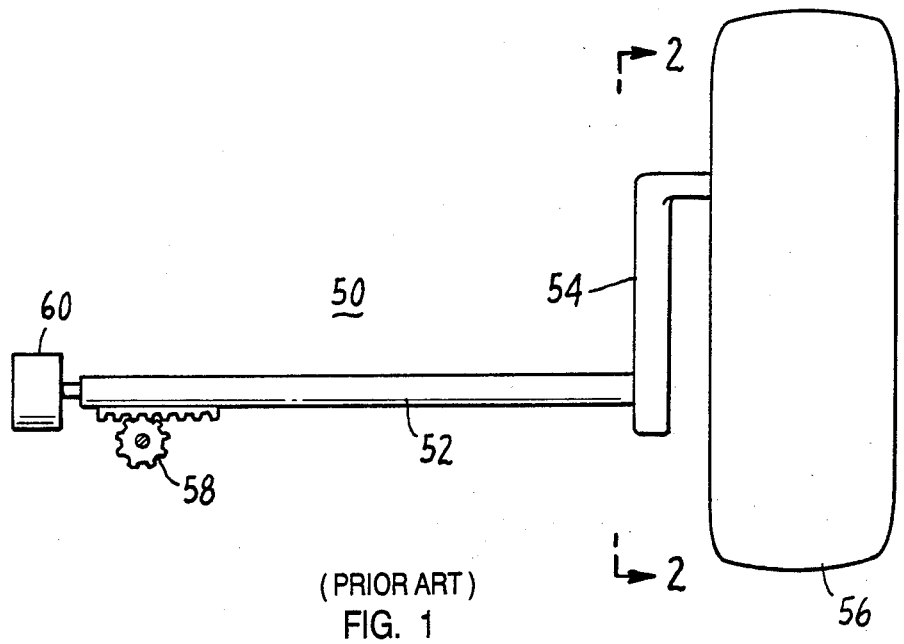
FIG. 1 is a side view of a distance and diameter measuring apparatus of the prior art, used in the measurement of a wheel.

Referring to FIG. 1, there is shown a side view of an apparatus 50 of the prior art. The apparatus 50 comprises an axially slidable major arm 52. A minor arm 54 is attached at one end of the major arm 52 and is rotatable. The apparatus 50 is for the measurement of the distance to a wheel 56 and the diameter of the inner rim of the wheel 56. A rack and pinion gear arrangement 58 converts linear motion of the major arm 52 into rotational motion which moves a potentiometer, which in turn generates an electrical signal. Attached at the other end of the major arm 52 is a second potentiometer 60 which translates the rotational motion of the minor arm 54 into a second electrical signal.

Figure 2:
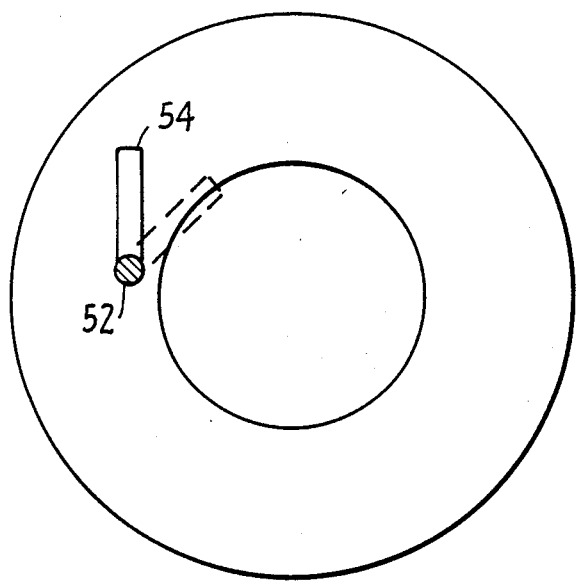
FIG. 2 is a partial cross-sectional view, taken along the line 2—2, showing the measurement of the diameter of the wheel in FIG. 1.

The apparatus 50 is located off-center of a wheel 56. Thus, as the minor arm 54 is rotated, the amount of rotation is determinative of the size of the diameter of the inner rim of the wheel 56, as shown in FIG. 2.

Referring to FIG. 3 there is shown an apparatus 30 of the present invention. The apparatus 30 comprises a metal pull-out arm distance arm 1 (major arm), which slides in two plastic bearings 2 and 3, which are stationary and are fixed to the frame 4 of a wheel balancer machine. A minor arm 5 is attached to the outboard end of the major arm 1. The major arm 1 has an axis which is of non-circular cross-sectional shape as shown in FIG. 2. Any non-circular cross-sectional shape can be used. Major arm 1 slides inside a rotatable pulley 6 which is prevented from moving axially by perforated angle plate 7. The rotatable pulley 6 has a hole which is substantially the same shape as the cross-sectional shape of the major arm 1. Thus, the axial motion of the major arm 1 will not move the pulley 6. However, the rotation of the major arm 1 will rotate the pulley 6.

Another pulley 8 is situated near pulley 6 and a wire cable 9 passes over and is fixed to both, so that when pulley 6 is rotated by the rotation of the major arm 1, the cable 9 is pulled in and pulley 8 is rotated and, in turn, rotates the shaft of the potentiometer 10. A spiral-shaped constant-tension spring 11 is held between pin 12 in the pulley 8 and pin 13 fixed to the frame 4. This spring 11 has a pre-tension and tends to return the major arm 1 and the potentiometer 10 to their rotational rest position.

At the end of the major arm 1 opposite the minor arm 5, there is a hook 14 to which is affixed a cable 15, which passes over pulley 16. Pulley 16 is also equipped with a constant tension spring 17 which act to return the major arm 1 to its axial rest position. Spring 17 fits into a slot 18 on the pulley 16 and another pin 19 fixed to the frame 4. Pulley 16 also is fixed to the shaft of a potentiometer 20 whose rotation is a measure of the distance the major arm 1 is pulled out of the balancer machine.

In practice, the minor arm 5 is grasped by the operator and pulled outward and rotated so that the tip 21 touches the inside rim of the body to be balanced at the place where the compensating weight will be attached.

Major arm 1 slides through pulley 6, but because of the non-circular cross-section of major arm 1, pulley 6 does not rotate with major arm 1 being moved in the axial direction, but rotates when the major arm 1 rotates.

Axial motion of major arm 1 turns pulley 16 and potentiometer 20 by means of cable 15. Rotational motion of pulley 6 causes pulley 8 and potentiometer 10 to rotate. Upon releasing the minor arm 5, the two springs 11 and 17 cause the major arm 1 and the minor arm 5 to return to their rest position. The change in resistance of the potentiometer 20 is a linear (or proportional) measure of the distance of the inner rim, and the change of resistance of potentiometer 10 is a non-linear (or non-proportional) measure of the diameter of the rim of the wheel.

Figure 5:
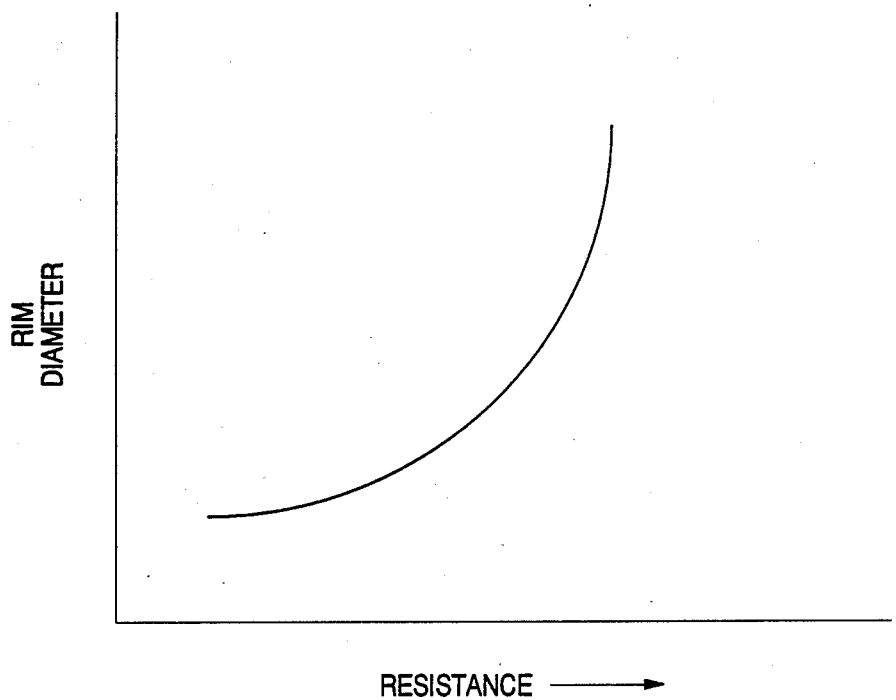
FIG. 5 is a graph of resistance measured for various diameters.

FIG. 5 shows a typical graph of resistance measured for various diameters. This relationship is complex, depending on the position of the center of the distance arm 1 compared to the axis of the balancing shaft, the length of the minor arm 5, and the size and shape of the tip 21 of the minor arm 5, but it can easily be approximated by a quadratic equation.

In the spirit of the invention, other forms of rotational transducers can be utilized; e.g., optional encoders. Also, the various fixed parts of the frame and the fixed perforated angle bracket 7 could all be made as one part by die-casting or similar manufacturing process.

What is claimed is:

1. An apparatus for measuring both the diameter of an object having a plane with a substantially circular shape in said plane and the distance of the object from said plane to a reference plane comprising:

a major arm having an axis and two ends, with a non-circular shape along a cross-section of said axis;

a first stationary support bearing and a second stationary support bearing for support said major arm along its axis such that said arm is axially slidable and rotatable;

a minor arm attached to a first end of said major arm for rotating said major arm;

a first pulley, adjacent to one of said support bearings, with a central hole, having substantially the same cross-sectional shape as the cross-sectional shape of said major arm, such that said major arm can slide through said first pulley without moving said first pulley, and rotate said first pulley as said major arm rotates;

a first rotational transducer for converting rotational movement into a first electrical signal;

first means for connecting said first pulley to said first rotational transducer;

means for biasing said first rotational transducer to urge it to a resting position;

a second rotational transducer for converting rotational movement into a second electrical signal;

means for translating the axial movement of said major arm into a rotational movement; and second means for connecting said translating means to said second rotational transducer.

2. The apparatus of claim 1 wherein said first connecting means further comprises:

a second pulley attached to said first rotational transducer; and a first cable attaching said second pulley to said first pulley.

3. The apparatus of claim 1 wherein said translating means further comprises a second cable attaching the second end of said major arm to said second connecting means.

4. The apparatus of claim 3 wherein said second connecting means further comprises:

a third pulley attached to said second rotational transducer with said second cable attached to said third pulley.

5. The apparatus of claim 4 further comprising:

a second means for biasing said second rotational transducer to urge it to a resting position.

* * * * *